United States Patent
Okabe et al.

(10) Patent No.: US 8,061,738 B2
(45) Date of Patent: Nov. 22, 2011

(54) GAS REPLACEMENT SYSTEM

(75) Inventors: Tsutomu Okabe, Tokyo (JP); Toshihiko Miyajima, Tokyo (JP); Hitoshi Suzuki, Tokyo (JP)

(73) Assignee: TDK Corporation, Tokyo (JP)

(*) Notice: Subject to any disclaimer, the term of this patent is extended or adjusted under 35 U.S.C. 154(b) by 386 days.

(21) Appl. No.: 12/466,952

(22) Filed: May 15, 2009

(65) Prior Publication Data

US 2009/0218773 A1 Sep. 3, 2009

Related U.S. Application Data

(62) Division of application No. 11/675,901, filed on Feb. 16, 2007, now abandoned.

(30) Foreign Application Priority Data

Feb. 20, 2006 (JP) ................................. 2006-042324

(51) Int. Cl.
*F16L 17/00* (2006.01)

(52) U.S. Cl. ..... 285/110; 285/106; 285/204; 285/141.1; 15/301

(58) Field of Classification Search ............... 285/139.2, 285/140.1, 141.1, 142.1, 143.1, 204, 203, 285/201, 325, 202, 368, 110, 108, 99, 95, 285/106; 15/301
See application file for complete search history.

(56) References Cited

U.S. PATENT DOCUMENTS

| | | | |
|---|---|---|---|
| 1,246,620 A | 11/1917 | Levy | |
| 1,332,686 A * | 3/1920 | Reynolds | 285/202 |
| 2,062,780 A * | 12/1936 | Curtis | 285/202 |
| 2,384,360 A * | 9/1945 | Allen et al. | 285/110 |
| 2,773,366 A | 12/1956 | Slaght | |
| 3,098,662 A * | 7/1963 | Iversen | 285/110 |
| 3,145,035 A * | 8/1964 | Hanback | 285/110 |
| 3,327,429 A | 6/1967 | Slaughter | |
| 3,334,774 A | 8/1967 | Jacob | |
| 3,948,315 A * | 4/1976 | Powell | 285/110 |
| 4,469,335 A | 9/1984 | Moore | |
| 4,758,004 A | 7/1988 | Semon | |
| 5,090,713 A | 2/1992 | Johnson | |
| 5,338,075 A * | 8/1994 | Albrecht | 285/368 |
| 5,613,691 A | 3/1997 | Komai et al. | |
| 5,653,447 A | 8/1997 | Cress | |
| 5,676,373 A | 10/1997 | Sakai et al. | |
| 5,988,233 A | 11/1999 | Fosnight et al. | |
| 6,164,664 A | 12/2000 | Fosnight et al. | |
| 6,186,152 B1 | 2/2001 | Gueret | |
| 6,354,601 B1 | 3/2002 | Krampotich et al. | |

(Continued)

FOREIGN PATENT DOCUMENTS

JP 59-69570 4/1984

(Continued)

*Primary Examiner* — David E Bochna
(74) *Attorney, Agent, or Firm* — Oblon, Spivak, McClelland, Maier & Neustadt, L.L.P.

(57) ABSTRACT

A seal member has a configuration including a ring-shaped main body portion, an inner peripheral lip portion protruding from a ring inner peripheral portion of the main body portion and an outer peripheral lip portion protruding from a ring outer peripheral portion of the main body portion. The inner peripheral lip portion takes an O-ring shape deformable in a protruding direction. The outer peripheral lip portion takes a structure deformable in a direction different from an extending direction, corresponding to a pressure in a sealed area. The member preferably seals when in communication with a plurality of spaces separated from an external space, the plurality of spaces from an external environment.

1 Claim, 6 Drawing Sheets

U.S. PATENT DOCUMENTS

| | | |
|---|---|---|
| 6,364,152 B1 | 4/2002 | Poslinski et al. |
| 6,832,444 B1 | 12/2004 | MacNeil |
| 7,063,327 B2 | 6/2006 | Salameh |
| 7,282,097 B2 | 10/2007 | Tanase et al. |
| 7,413,099 B2 | 8/2008 | Takahashi et al. |
| 2004/0237244 A1 | 12/2004 | Suzuki et al. |

FOREIGN PATENT DOCUMENTS

| | | |
|---|---|---|
| JP | 63-130653 | 8/1988 |
| JP | 8-203993 | 8/1996 |
| JP | 2002-510150 | 4/2002 |
| JP | 2002-531934 | 9/2002 |
| JP | 2004-345715 | 12/2004 |
| JP | 2004-349619 | 12/2004 |
| WO | WO 99/50145 | 10/1999 |
| WO | WO 00/32472 | 6/2000 |

\* cited by examiner

GAS REPLACEMENT SYSTEM

BACKGROUND OF THE INVENTION

1. Field of the Invention

The present invention relates generally to a member employed corresponding to a product storage container used for storing an object such as a semiconductor, a panel for a flat panel display and an optical disc in a process of manufacturing the object undergoing a process under a high-purity environment, i.e., corresponding to the container retained in a state where an internal pressure thereof is different from an ambient pressure. The present invention relates to more particularly to a so-called interface seal (which will hereinafter be referred to as a seal member) used when connecting the container, which is a so-called FOUP (Front-Opening Unified Pod) employed to store 300 mm semiconductor wafers each having a diameter of 300 mm mainly in a processing step of the 300 mm semiconductor wafers, to a gas replacement system for replacing a gas sealed in an interior of the container.

2. Related Background Art

A connecting portion between the FOUP and the gas replacement system connected to the FOUP is, as described above, exemplified by way of a specific example using the seal member according to the present invention. In such a usage example, especially a stable sealing characteristic with respect to an ambient environment is required of the seal member. Accordingly, on the occasion of describing the present invention, particularly technologies related to the FOUP will be descried as exemplifications of the prior arts.

In the semiconductor device manufacturing process, high purification required in the process has hitherto involved attaining cleanliness of rooms in the whole factory for conducting a variety of processes for the wafers. With a larger diameter of the wafer, this type of measure leads to a problem of cost for acquiring the (high-purity) environment in terms of the construction. Over the recent years, there have been adopted means for ensuring mini-environment spaces kept in a high degree of purity for each of the processing apparatuses.

To be specific, a scheme is not to enhance the degree of purity of the whole factor but to keep in the high degree of purity only an interior of each processing apparatus in the manufacturing process and an interior of a storage container (which will hereinafter be called a pod) while being carried. This pod is, as described above, generically referred to as the FOUP. Thus, the same effect as by attaining the cleanliness of the rooms of the whole factory, is acquired by adopting a so-called mini-environment system that highly purifies only slight amounts of spaces, thereby actualizing an efficient production process in a way that reduces an investment for equipment and a maintenance cost as well.

A semiconductor processing apparatus etc corresponding to the so-called mini-environment system will hereinafter be briefly described. The semiconductor wafer processing apparatus mainly includes a Loadport portion in which to perform operations of placing a pod for inserting and removing the wafer and opening/closing a cover of the pod, a carrier chamber in which a robot is disposed inside and carries the wafer, and a processing chamber in which the wafer is received from the robot and subjected to a variety of processes. The respective joined portions are sectioned respectively by corresponding pieces of partitions and covers. In the carrier chamber of the semiconductor wafer processing apparatus, an air flow is generated by a fan provided at an upper portion of the carrier chamber toward a lower part from an upper part of the carrier chamber in order to keep the high degree of purity by purging the carrier chamber of dusts. The existence of the air flow causes the dusts to be discharged toward the lower side at all times.

Above the Loadport portion, the pod defined as the storage container for a stored product such as a silicon wafer (which will hereinafter simply be termed a wafer) is secured onto a predetermined mounting plate. As described earlier, the interior of the carrier chamber is kept in the high degree of purity for processing the wafer, and the robot is disposed inside the carrier chamber. The wafer is carried by the robot arm between the interior of the pod and the interior of the processing chamber. The processing chamber normally includes a variety of mechanisms for executing the processes such as forming a thin film on the wafer surface and processing the thin film, however, descriptions of the constructions thereof, which are not related directly to the present invention, are therefore omitted herein.

The pod has a space for internally accommodating the wafer defined as an object to be processed. The pod includes a box-shaped main body portion having an opening portion on any one of surfaces, and a cover for airtightly closing the opening portion. A multi-staged rack for stacking the wafers in one direction is disposed in an interior of the main body portion. The pod internally accommodates the wafers placed at a fixed interval in the rack. Note that the direction of stacking the wafers is set in a perpendicular direction in the FOUP exemplified herein. An opening portion is provided on the side of the Loadport portion of the carrier chamber. The opening portion is disposed in a position having a face-to-face relationship with the opening portion of the pod when the pod is disposed above the Loadport portion so as to get close to the opening portion. An opener is provided in the vicinity of the opening portion inwardly of the carrier chamber. After the opener has taken the cover out of the pod, the wafer is carried in or carried out by the robot arm.

Normally, a recessed portion, an intake port and an exhaust port are provided at the lower portion of the pod. The plate surface is provided with a positioning pin that regulates a pod mounting position by fitting in the recessed portion, a plate-side intake port abutting on the pod-side intake port, and a plate-side exhaust port abutting on the pod-side exhaust port. Seal members for enhancing air-tightness of abutting portions at which the plate-side intake/exhaust ports abut on the pod-side ports, are disposed in the opening portions of the plate-side intake/exhaust ports. Filter members are disposed in the vicinities of the opening portions of the pod-side intake/exhaust ports, thereby preventing dusts etc from entering the interior of the pod via the ports. The intake port and the exhaust port on the plate side are connected via respective check valves and flow meters to a replacement gas supply source and to a replacement gas discharge source as external devices.

For instance, Japanese Patent Application Laid-Open No.2002-531934 or Japanese Patent Application Laid-Open No.8-203993 discusses outlines of the constructions described above. Normally, the wafer restrained from adhesion of the dusts is brought into the pod for accommodating the products, and an internal atmosphere of the pod is replaced by an inert gas such as clean nitrogen, thus restraining occurrence a chemical change caused by natural oxidation or organic contamination over the wafer surface in an accommodated state. Such an internal atmosphere replacing operation is conducted via a gas flow path formed extending from the intake/exhaust ports provided in the pod and the plate in the state where the pod is mounted on the plate. Accordingly, the gas flow path is required to have a size enabling a sufficient amount of replacement gas or internal atmosphere to flow, and is required to ensure sufficient tightness for preventing the replacement gas or the internal atmosphere from being contaminated. The seal members used at these intake/exhaust ports are therefore demanded to ensure the sufficient sealing characteristic that meet these requirements.

So-called packing taking a ring-like shape has hitherto been utilized as the seal member. FIGS. 8A and 8B illustrate schematic sectional views of the pod-side exhaust (intake) port and the plate-side exhaust (intake) port in the case of using the packing. FIG. 8A illustrates a case of using a seal member 18a taking a so-called domed shape having a curved internal surface shape of which an inside diameter gets smaller as it gets closer to an upper opening. FIG. 8B illustrates a case of using a seal member 18b taking a so-called funnel-like shape having a curved internal surface shape of which an inside diameter gets larger as it gets closer to the upper opening.

If a pressure within the packing, i.e., a pressure on the side of the gas flow path is larger than a pressure outside the packing, a pressure causing the domed shape to deform outside is applied to the seal member 18a illustrated in FIG. 8A. A case of using the seal member 18a on the side of the intake port is considered as this situation. In this case, a deforming pressure is applied to the sealing surface of the seal member 18a so as to tightly fit to a port edge portion on the pod side, whereby the sealing characteristic is more strengthened and stabilized. Whereas if the internal pressure of the packing is smaller than the outside pressure, namely in the case of employing the seal member 18a on the side of the exhaust port, the deforming pressure causing the domed shape to deform inside as indicated by an arrowhead in FIG. 8A, is applied due to this pressure difference. As a result, the tight fitting characteristic between the sealing surface of the seal member 18a and the pod-side port edge portion decreases, and it is also considered that a gap etc occurs in an extreme case.

If the internal pressure of the packing is smaller than the external pressure of the packing, a pressure causing the funnel-like shape to deform inside is applied to the seal member 18b illustrated in FIG. 8B. A case of using the seal member 18b on the side of the exhaust port is considered as this situation. In this case, a deforming pressure is applied to the sealing surface of the seal member 18b so as to tightly fit to the port edge portion on the side of the pod 2, whereby the sealing characteristic is more strengthened and stabilized. Whereas if the internal pressure of the packing is larger than the outside pressure, namely in the case of employing the seal member 18a on the side of the intake port, the deforming pressure causing the funnel-like shape to deform outside as indicated by an arrowhead in FIG. 8B, is applied due to this pressure difference. As a result, the tight fitting characteristic between the sealing surface of the seal member 18b and the pod-side port edge portion decreases, and it is also considered that the gap etc occurs in the extreme case.

It is therefore difficult to share the dome-shaped seal member and the funnel-shaped seal member with each other. The dome-shaped seal member and the funnel-shaped seal member are required to be used separately depending on a positive pressure or a negative pressure taken by a should-be-sealed environment (which will hereinafter be termed an intra-seal environment). The environment in which the seal member should be provided generally changes in pressure, and hence the individual sealing characteristic changes as the environment pressure changes. It is therefore necessary for the seal member to deform at a fixed or larger level in a way that applies a load large enough to crush the seal member in order to ensure the fixed sealing characteristic. In this case, though required to apply the large load, such a problem arises that the seal member gets into plastic deformation as the seal member repeatedly gets deformed, resulting in a high frequency of exchanging the seal member. At the same time, what is demanded for ensuring the preferable sealing characteristics by uniform deformations of the seal members is to always keep pod-side surface accuracy, plate-side surface accuracy and further accuracy of the sealing surface of the seal member. This brought about a rise in cost for processing these members.

Japanese Patent Application Laid-Open No. 2002-510150, U.S. Pat. No. 6,164,664 or U.S. Pat. No. 5,988,233 discuss a curved domed grommet or a bellow type seal member for the purpose of preventing the plastic deformation caused by repeatedly applying the load. These configurations seem to exhibit the preferable effects in terms of preventing the plastic deformation. It is, however, considered that none of particular effects are exhibited to cope with such a problem to be solved by the present invention that the sealing characteristic changes due to the change in pressure of the intra-seal environment.

SUMMARY OF THE INVENTION

It is an object of the present invention, which was devised in view of the problems described above, to provide a seal member capable of exhibiting a preferable sealing characteristic irrespective of a change in pressure, positive pressure or negative pressure, of an intra-seal environment.

It is another object of the present invention to provide a seal member capable of exhibiting the preferable sealing characteristic without applying a load large enough to cause excessive deformation of the seal member and attaining strict accuracy of a sealing surface.

To accomplish the above objects, according to one aspect of the present invention, a seal member is disposed between an opening portion forming surface of a first space and an opening portion forming surface of a second space to separate the first and second spaces from the ambiance when connecting together the first space and the second space each having an opening portion that are capable of keeping an internal pressure at a pressure different from an ambient pressure while being each separated from the ambiance, the seal member comprising a main body portion taking a ring-shape and fixed along an outer periphery of the opening portion in any one of the opening portion forming surface of the first space and the opening portion forming surface of the second space; an inner peripheral lip portion extending from an inner peripheral portion of a ring-shaped upper surface of the main body portion substantially in a direction of another opening portion forming surface different from the opening portion forming surface on the side where the main body portion is fixed, and an outer peripheral lip portion extending from an outer peripheral portion of the ring-shaped upper surface of the main body portion substantially in the direction of another opening portion forming surface different from the opening portion forming surface on the side where the main body portion is fixed, wherein the inner peripheral lip portion takes an O-ring shape connected to the inner peripheral portion in the main body portion and can deform in a direction vertical to the ring-shaped upper surface of the main body portion, and the outer peripheral lip portion can deform in a direction substantially parallel with the ring-shaped upper surface of the main body portion.

It should be noted that the main body portion has, it is preferable, a hole penetrating from the ring-shaped upper surface down to a ring-shaped undersurface formed with neither the inner peripheral lip portion nor the outer peripheral lip portion between the inner peripheral lip portion and the outer peripheral lip portion. In the seal member, it is more preferable that the outer peripheral lip portion takes substantially a funnel-like shape of which an inside diameter gets larger as it gets farther away from the main body portion.

As compared with the grommet or the bellow type seal member described above, it is considered to employ a simple so-called O-ring shaped seal member. The O-ring shaped seal member exhibits a sufficient sealing characteristic without the large deformation and has an advantage of having high durability against a change in pressure of an intra-seal environment. When used actually, however, on the occasion of holding the O-ring between two ports, the sealing surface (which will hereinafter be described as an opposite surface) having a face-to-face relationship with the O-ring on a pod undersurface or a plate upper surface is tightly fitted to the entire peripheral area of the O-ring, and, if possible, the O-ring is required to get deformed by applying a load having a predetermined or larger value. In this point, the pod is, it is considered, hard to meet the conditions such as the tight fitting to the entire periphery and the applied load in terms of being manufactured from a resin etc. The present invention provides the lip portion taking the shape that is easy to tightly fit to the opposite surface at the outer peripheral portion, specifically the shape that is thin and extends toward the opposite surface. A certain degree of air-tightness is ensured by tightly fitting the lip portion to the opposite surface. The O-ring shaped lip portion is provided at the inner peripheral portion. The stable sealing characteristic is obtained by the O-ring shaped lip portion even in such a case that the pressure of the intra-seal environment largely changes or changes under a condition that the outer peripheral lip portion is hard to follow. Hence, it is possible to acquire preferentiality of the O-ring shaped seal member and availability of the seal member (which will hereinafter be referred to as a conventional lip) described in the prior art in a way that establishes compatibility between the preferentiality and the availability by use of the seal member according to the present invention.

For example, an effect in the case of using the seal member according to the present invention at the port on the gas supplying side, will hereinafter be described. In a normal purging operation, the pressure of the intra-seal environment is higher than a pressure (normally, the atmospheric pressure) of an ambient environment. In this case, even when the entire periphery of the O-ring shape defined as the inner peripheral lip portion is not tightly fitted to the opposite surface, there is basically no occurrence of a gas inflow from the ambient environment in terms of a pressure difference. Because of the existence of the outer peripheral lip portion, a conductance of a route leading from the intra-seal environment to the ambient environment is extremely small, and an inflow of a purge gas is restrained at a slight level. Accordingly, the purge gas is introduced into the interior of the pod efficiently and effectively.

Note that abrupt introduction of the purge gas into the interior of the pod might vibrate the wafer and might generate dusts etc by causing a turbulent flow within the pod. Hence, there exists a case where the purging operation be, it is preferable, conducted while slightly keeping an amount of introduction of the purge gas. With micronization of a line width of the semiconductor, it is also considered that there will be increasingly such a demand from now into the future. In this instance, if taking the shape given in the U.S. Patent Publication 6,164,664 or Japanese Patent Application Laid-Open Publication No. 2004-349619 in which the sealing action is exhibited, e.g., when the inner peripheral lip portion is formed in a thin shape and when the pressure of the intra-seal environment is higher than the pressure of the ambient environment, the pressure difference between these two environments is slight, and there is also considered a case of being unable to obtain the sufficient sealing action. Namely, because of the pressure difference being slight, the thin lip portion, which is to get deformed by the pressure of the intra-seal environment, does not deform, and such a case might occur that the sufficiently fitted state to the opposite surface is not acquired. As in the present invention, the inner peripheral lip portion is given the O-ring shape, whereby even when the pressure difference between the intra-seal environment and the ambient environment is slight, the preferable sealing action is acquired at al times.

There is also considered a case in which when performing the purging operation, a gas existing in the interior of the pod is forcibly exhausted from the exhaust port via a vacuum pump etc. In this case, if the amount of introduction of the purge gas is set slight, with a supply-to-discharge balance, there is a possibility in which the pressure of the intra-seal environment becomes lower than the pressure of the ambient environment. In this case, the inner peripheral lip portion taking the O-ring shape can provide only the sealing characteristic corresponding to a degree of the tight fitting of the lip portion to the opposite surface when mounting the pod. The outer peripheral lip portion is, however, formed in a shape that enhances a tight fitting characteristic to the opposite surface by flexure toward the interior of the seal if the pressure of the ambient environment is high, specifically in a horn-like shape of which an inside diameter becomes larger as it gets closer to the opposite surface. This shape enables the sufficient sealing characteristic to be obtained owing to the outer peripheral lip portion. In the case of controlling the amount of introduction when introducing the purge gas, a generally employed method is a method of controlling a flow rate of the gas led from a gas supply source by use of a so-called massflow controller. If an abnormal state occurs in the gas supply source or in the massflow controller, it is considered that the gas stagnates for supply and the pressure of the intra-seal environment becomes lower than the pressure of the ambient environment. The use of the seal member according to the present invention enables the gas inflow into the intra-seal environment from the ambient environment to be prevented owing to the outer peripheral lip portion even in such a case.

For example, in the case of using the seal member according to the present invention at the port on the gas exhaust side, the pressure of the intra-seal environment is always lower than the pressure of the ambient environment. In this instance, the primary sealing effect is acquired by the O-ring shaped inner peripheral lip portion. Even if the inner peripheral lip portion and the opposite surface are not in the preferable tight-fitted state, as described above, the sealing effect can be surely acquired owing to the deformation of the outer peripheral lip portion. Therefore, the use of the seal member according to the present invention enables the intra-seal environment and the ambient environment to be surely spatially separated from each other.

The seal member according to the present invention has a structure including the main body portion, the inner peripheral lip portion, the outer peripheral lip portion and the space formed with respect to the sealing surface (opposite surface) of the member having the face-to-face relationship with these components. The seal member also has the suction hole via which the interior of the space is exhausted. With this construction being taken, the seal member is more firmly tightly fitted to the sealing surface that faces the seal member by exhausting the interior of the space, thereby enabling the excellent sealing characteristic to be obtained. Thus, the sealing surface of the seal member is tightly fitted to the sealing surface of the member that faces the seal member by dint of physical adsorptive action. Hence, even when the surface accuracy demanded of these sealing surfaces is at a level lower than the surface accuracy demanded of the conventional sealing surfaces, this level is allowable. The sealing state can be checked by monitoring the internal pressure of the space described above.

In this case, both of the inner peripheral lip portion and the outer peripheral lip portion are forcibly tightly fitted to the opposite surfaces by the physical adsorptive action, and a certain or larger degree of sealing effect can be surely obtained. As described above, in the case of introducing the purge gas at a slight flow rate into the pod, however, the spatial pressure within the seal also decreases, and such a case is also considered that a sufficient pressure difference between the space and the intra-seal space is not obtained. In the case of the structure of the lip portion discussed in the Patent document 2 or Patent document 6, the sealing effect is obtained by the lip portion only in the state where the pressure difference comes to a predetermined or larger value. Accordingly, there might be a possibility in which the sufficient sealing effect is not acquired from the seal member having this structure. Note that there occurs the sufficient difference between the internal pressure of the space and the pressure of the ambient environment, and hence the outer peripheral lip portion provides the stable sealing effect. The inner peripheral lip portion does not exhibit the sealing effect, and the inflow of the purge gas into the space from within the seal sufficiently might occur. If such a situation arises, the sealing action of the outer peripheral lip portion might be reduced due to the decrease in the purging effect and the decrease in the pressure difference. As to the seal member according to the present invention, the inner peripheral lip portion involves using the O-ring shaped lip portion. Hence, even when there is almost no difference between the internal pressure of the space and the pressure of the intra-seal environment, the sealing effect approximate to a desired level can be always stably acquired. It is therefore possible to prevent the situations such as the decrease in the purging effect described above and the decrease in the sealing effect of the seal member.

For instance, in the case of employing the seal member according to the present invention enabling the space to be exhausted at the port on the gas exhaust side, the pressure of the intra-seal environment is always lower than the pressure of the ambient environment. In this case, the primary sealing effect is obtained by the O-ring shaped inner peripheral lip portion, and the seal member is preferably tightly fitted to the opposite surface, whereby the sealing effect can be further enhanced. If the tight-fitted state between the inner peripheral lip portion and the opposite surface is not preferable, as described above, the sure sealing effect can be acquired owing to the deformation of the outer peripheral lip portion. Therefore, the use of the seal member according to the present invention enables the intra-seal environment and the ambient environment to be surely spatially separated from each other.

DESCRIPTION OF THE PREFERRED EMBODIMENTS

Figure 1:
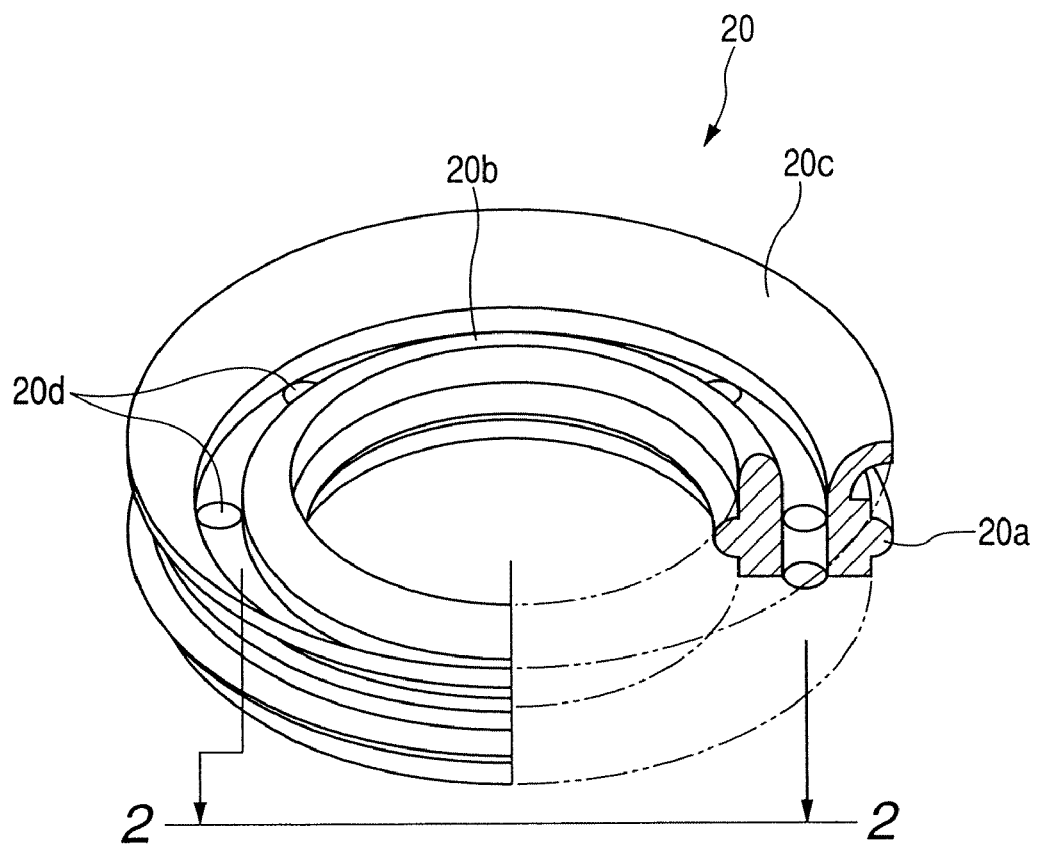
FIG. 1 is a view illustrating a state of a seal member and a partial section of this seal member according to one embodiment as viewed from an oblique side.
Figure 2:
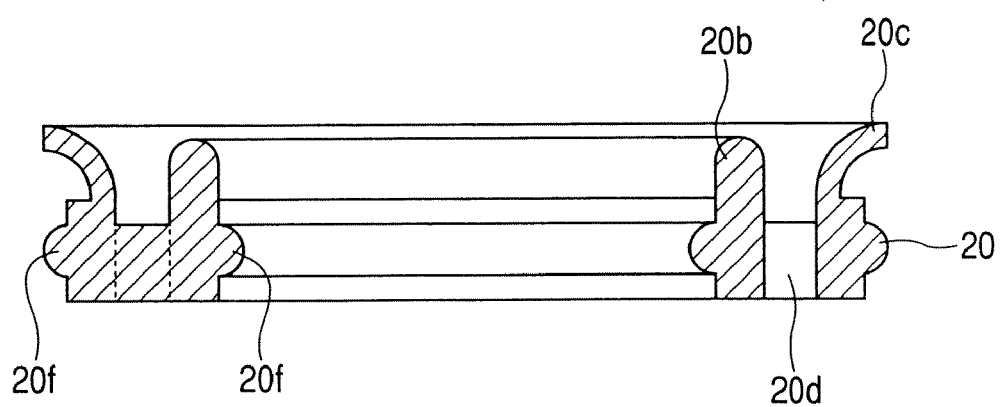
FIG. 2 is a view illustrating a sectional shape of the seal member illustrated in FIG. 1.

One embodiment of the present invention will hereinafter be described with reference to the drawings. FIG. 1 is a perspective view including a partial sectional view of a seal member according to the present invention. FIG. 2 illustrates a sectional view of the seal member taken along the line 2-2 in FIG. 1. A seal member 20 according to the present invention has a dual seal structure. The seal member 20 includes a main body portion 20a taking substantially a ring-shape, an inner peripheral lip portion 20b formed along an inner periphery on an upper surface side of the main body portion 20a, and an outer peripheral lip portion 20c formed further along an outer periphery on the surface side formed with the inner peripheral lip portion 20b in the main body portion 20a. A plurality of suction holes 20d penetrating through a lower surface from the upper surface of the main body portion 20a is provided between the inner peripheral lip portion 20b and the outer peripheral lip portion 20c in the main body portion 20a. In the present embodiment, protruded portions 20f are formed along the ring-shaped inner periphery and along the ring-shaped outer periphery of the main body portion 20a. In the case of fixing the seal member 20 onto, e.g., the surface on the plate side, a ring-shaped lower area of the main body portion 20a of the seal member 20 is embedded in a groove formed in the plate, and the protruded portions 20f are utilized, thereby attaining fixation to the plate of the seal member 20.

The inner peripheral lip portion 20b takes a cylindrical shape erecting up to a predetermined height from the upper surface of the main body portion 20a substantially in a vertical direction. In the present embodiment, at the upper edge of the cylindrical shape, when cutting the cylindrical shape in a lengthwise direction, the upper portion shall take a semicircular shape. In the present specification, the description is simplified in a way that treats this shape as an O-ring shape. Namely, the inner peripheral lip portion 20b has the O-ring shape formed in continuation from the ring-shaped portion of the main body portion 20a, and is enabled to deform in a direction vertical to the ring-shaped upper surface. The outer peripheral lip portion 20c has substantially a cylindrical shape that is thin and extends upward from the upper surface of the main body portion 20a, and an inside diameter thereof increases as extended further upwards, thus having a funnel-like shape with respect to a central axis. With these shapes being thus taken, if a pressure in an intra-seal environment is kept higher than a pressure in an ambient environment, the inner peripheral lip portion 20b taking the O-ring shape exhibits the suitable sealing action. Further, if the pressure in the intra-seal environment is kept lower than the pressure in the ambient environment, the outer peripheral lip portion 20c taking the funnel-like shape exhibits the suitable sealing action. Hence, the sealing characteristic can be obtained irrespectively of the pressure in the intra-seal environment. The two types of lip portions exhibit the different operations, and therefore, even if accuracy of the seal surface is low or if an amount of load applied to crush the seal member is slight, the good sealing characteristic can be obtained.

As described above, the seal member 20 illustrated in the present embodiment is formed with a suction hole 20d. The suction hole 20d penetrates, from the upper surface, down to the undersurface, the ring-shaped portion of the main body portion 20a including the continuous portion to the lip portion. Trough this suction hole 20d, when the inner peripheral lip portion 20b and the outer peripheral lip portion 20c in the seal member 20 abut respectively on a port edge portion on the pod side, air in an interior of an space formed by the inner peripheral lip portion 20b, the outer peripheral lip portion 20c and the port edge portion can be exhausted. This air exhaustion enables the seal member 20 to be airtightly fitted more firmly to the pod-sided port edge portion and the sealing characteristic to be further improved. The air exhaustion, even in the case of the low accuracy of the seal surface or in the case of the slight load applied to crush the seal member, the suitable sealing characteristic to be acquired by the seal member itself actively exhibiting the sealing action. It is to be noted that the seal member is formed with the suction hole, however, this suction hole may also be removed if there exists a load applied large enough to crush the seal member.

Figure 3:
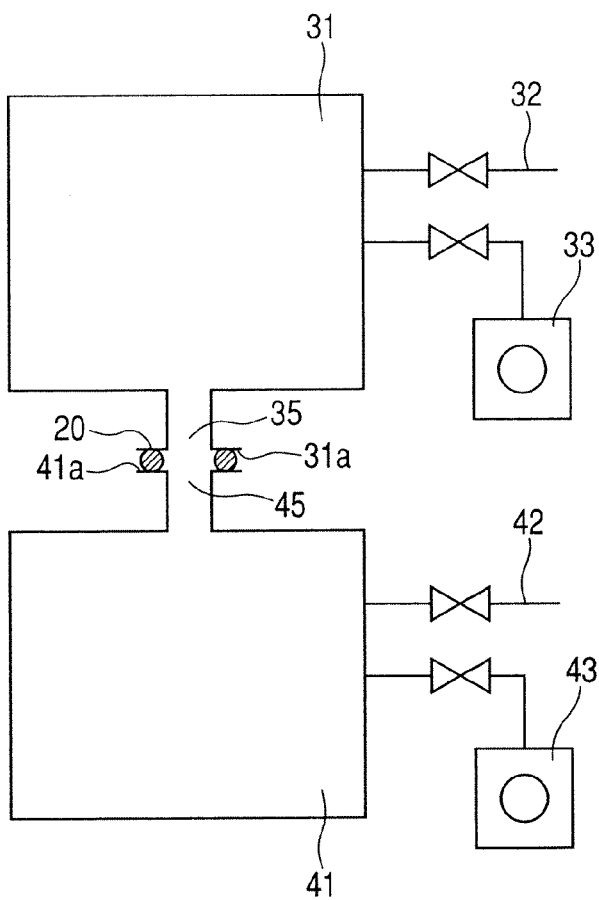
FIG. 3 is a view schematically illustrating a system that preferably employs the seal member according to the present invention.

An actual system using the seal member according to the present invention will hereinafter be briefly described with reference to the drawings. FIG. 3 illustrates this system including a first space 31 and a second space 41 that are separated from the ambient space. A first gas introducing system 32 used for increasing the internal pressure is connected to the first space 31. A first exhaust system 33 used for decreasing the internal pressure is also connected to the first space 31. Similarly, a second gas introducing system 42 used for increasing the internal pressure is connected to the second space 41. A second exhaust system 43 used for decreasing the internal pressure is also connected to the second space 41. The first space 31 has an opening portion 35 on opening portion forming surface 31a. The second space 41 has an opening portion 45 on an opening portion forming surface 41a.

The seal member 20 according to the present invention is disposed between these two opening portions 35 and 45, and is preferably employed for separating the system from the ambiance. Note that though omitted in the drawings, a system leading to the suction hole 20d in the seal member 20 according to the present invention may be provided separately from the gas introducing system and the exhaust system that are concomitant with the first and second spaces. The seal member according to the present invention can be preferably used in a case such as taking a construction that the first space has neither the gas introducing system nor the exhaust system while the second space has only the exhaust system and in a case where the first and second spaces get deformed.

Figure 4:
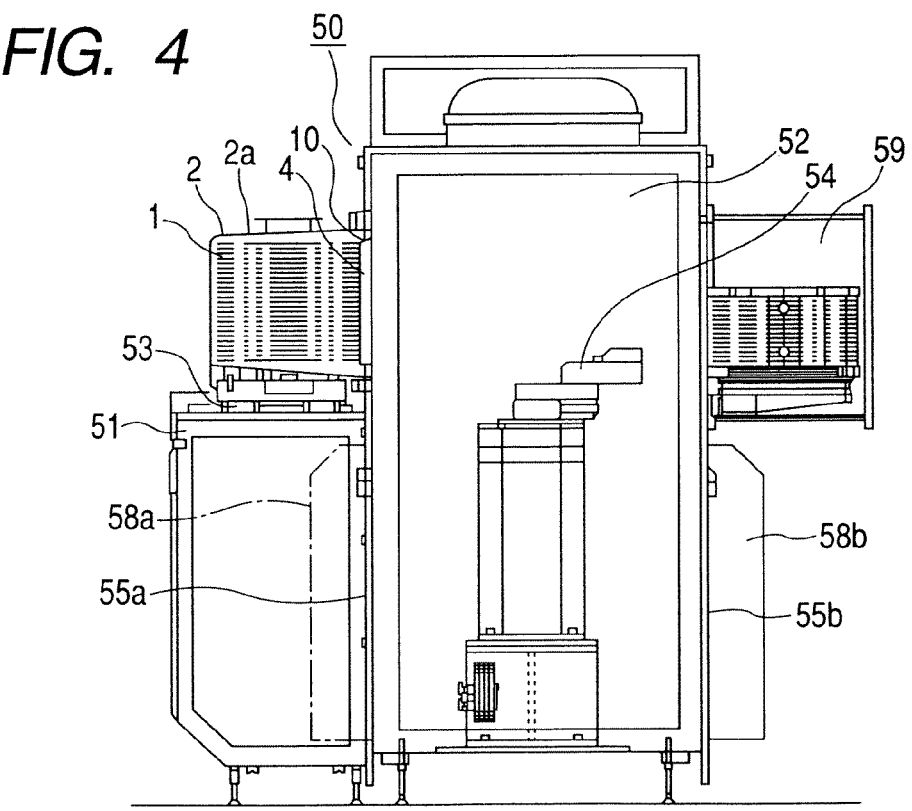
FIG. 4 is a whole side view illustrating an outline of a construction of a semiconductor wafer processing apparatus using the seal member according to the present invention.

Next, a case of applying the seal member according to the present invention to a system related to the FOUP used at the present, will hereinafter be described with reference to the drawings. FIG. 4 illustrates a whole semiconductor wafer processing apparatus 50 corresponding to a mini-environment system. The semiconductor wafer processing apparatus 50 mainly includes a Loadport portion 51, a carrier chamber 52 and a processing chamber 59. Connecting portions therebetween are sectioned by a partition 55a and a cover on the side of the Loadport and by a partition 55b and a cover 58b on the side of the processing chamber. In the carrier chamber 52 of the semiconductor wafer processing apparatus 50, an air flow is generated downward from above of the carrier chamber 52 by a fan (unillustrated) provided at the upper portion of the carrier chamber 52 in order to keep a high degree of purity by purging the carrier chamber 52 of dusts. The dusts are always sent downward along the air flow and thus discharged.

A pod 2 defined as a container for storing a product to be contained, such as a silicon wafer (which will hereinafter be simply referred to as a wafer), is installed on a plate 53. As described above, the interior of the carrier chamber 52 is kept in the high degree of purity in order to process a wafer 1. A robot 54 is provided in the interior of the carrier chamber 52. The wafer is carried by an arm of the robot 54 between an interior of the pod 2 and an interior of the processing chamber 59. The processing chamber 59 normally includes a variety of mechanisms for executing processes such as forming a thin film and working the thin film over the wafer surface. Constructions of these mechanisms are not related directly to the present invention, and hence their descriptions are herein omitted.

The pod 2 has a space for accommodating the wafer 1 defined as an object to be processed. The pod 2 includes a box-shaped main body portion 2a of which any one surface is formed with an opening portion, and a cover 4 for airtightly closing the opening portion (see FIG. 6 or 7). A multi-staged rack for stacking the wafers 1 in one direction is disposed in an interior of the main body portion 2a. The pod 2 accommodates the wafers 1 placed at a fixed interval in the rack. Note that the direction in which to stack the wafers 1 is set in a perpendicular direction in the example illustrated herein. An opening portion 10 is provided on the side of the Loadport portion 51 of the carrier chamber 52. The opening portion 10 is, when the pod 2 is disposed on the Loadport portion 51 in close proximity to the opening portion 10, situated in a position in face-to-face relationship with the opening portion of the pod 2. An unillustrated opener is provided in the vicinity of the opening portion 10 inwardly of the carrier chamber 52. After the opener has taken the cover 4 out of the pod 2, the wafer 1 is carried in or carried out by the arm of the robot 54.

Note that the mechanisms such as the opener for opening and closing the cover 4 of the pod 2 are not related directly to the present invention, and hence, the descriptions related to the prior arts being invoked, their in-depth descriptions are omitted. In the present applied example, it is considered that the first space corresponds to the pod, while the intake port and the exhaust port on the side of the plate correspond respectively to opening portions in the individual space corresponding to the second space.

Figure 5:
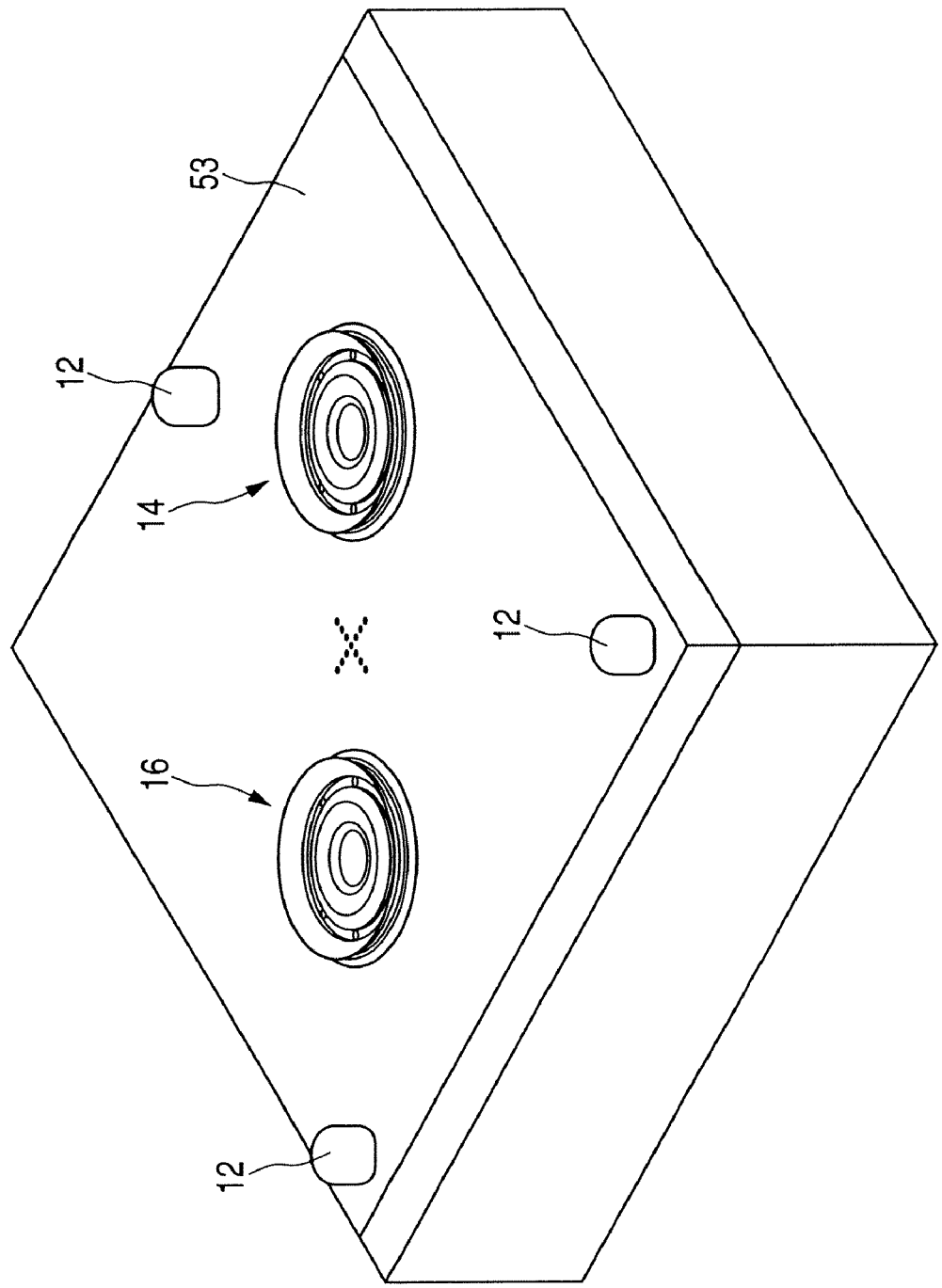
FIG. 5 is a view illustrating an outline of a construction of a plate as viewed from an upper oblique side when installing the seal member according to the present invention on the plate at a Loadport portion for an FOUP.
Figure 6:
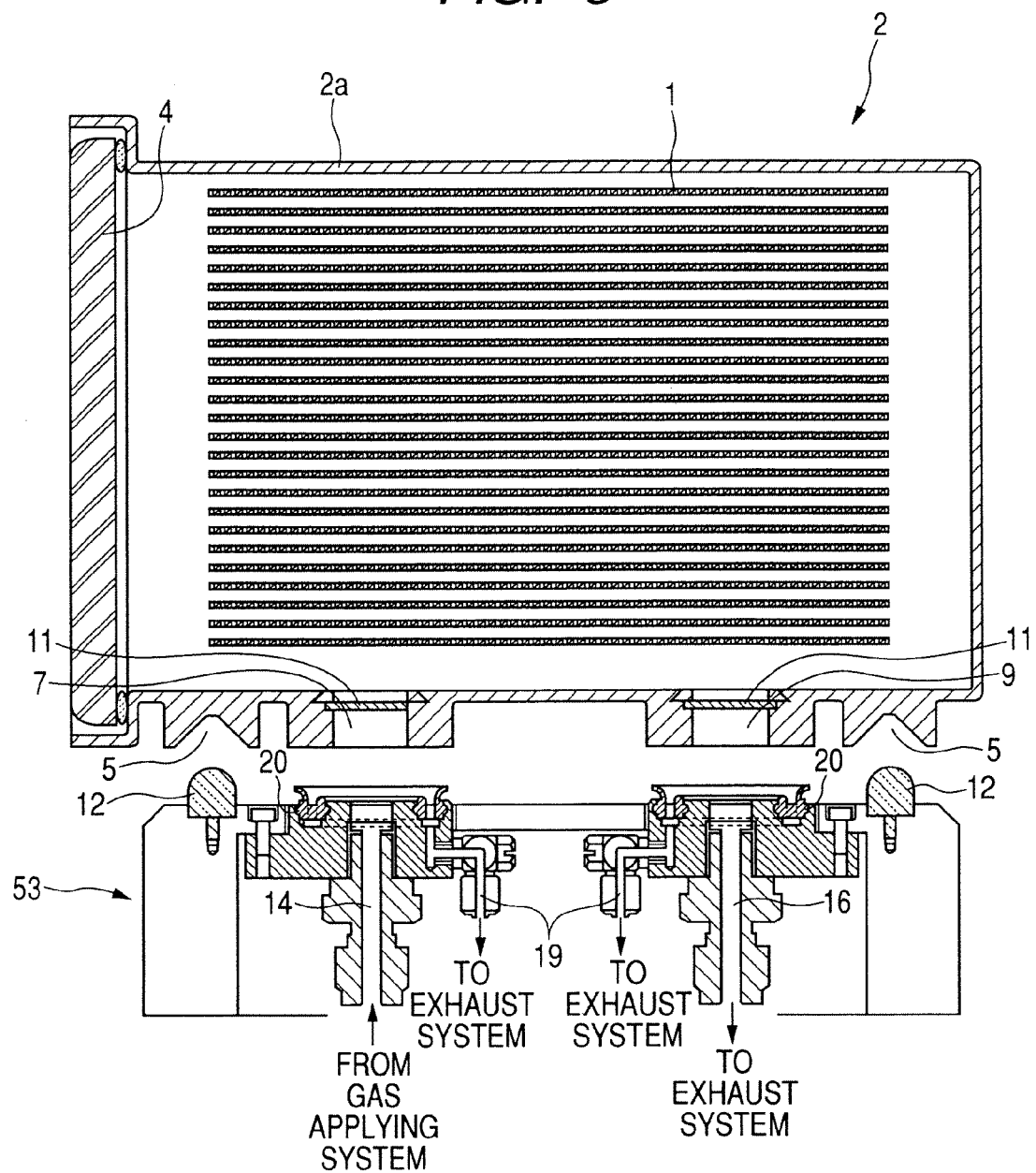
FIG. 6 is a view illustrating a schematic section of each of the constructions in a state where the FOUP is mounted on the plate illustrated in FIG. 3.
Figure 7:
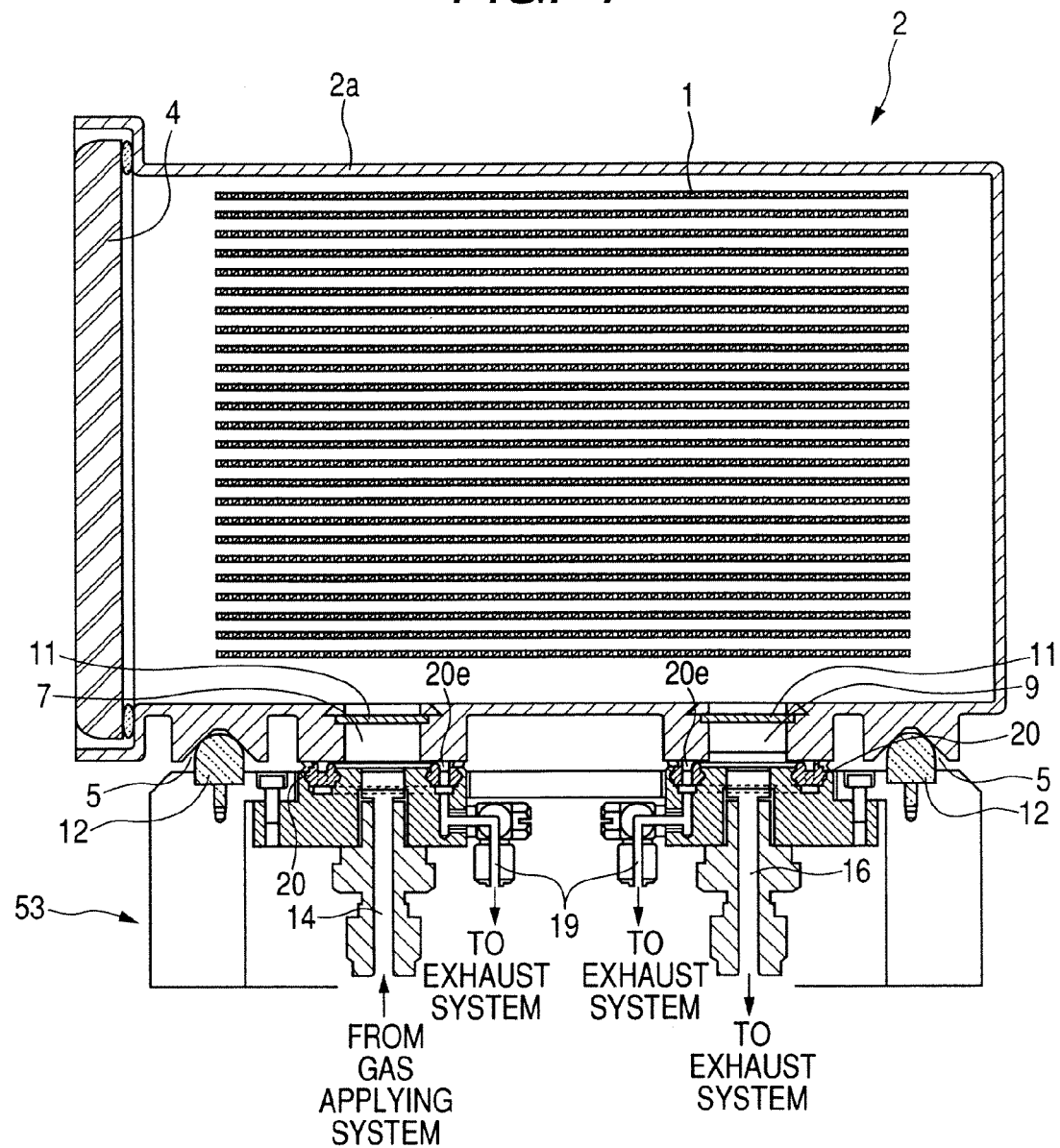
FIG. 7 is a view illustrating a schematic section of each of the constructions in a state where the FOUP is disposed on the plate illustrated in FIG. 3.
Figure 8A:
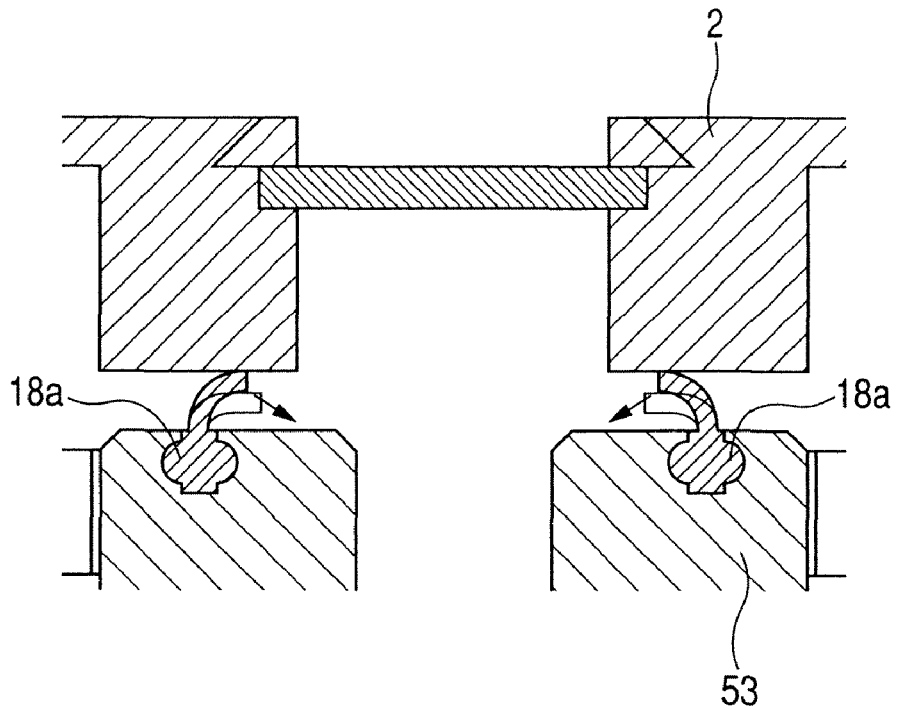
FIG. 8A is a view illustrating a schematic section of a conventional seal member, intake/exhaust port edge portions in the plate using this seal member and opposite intake/exhaust port edge portions in the pod.
Figure 8B:
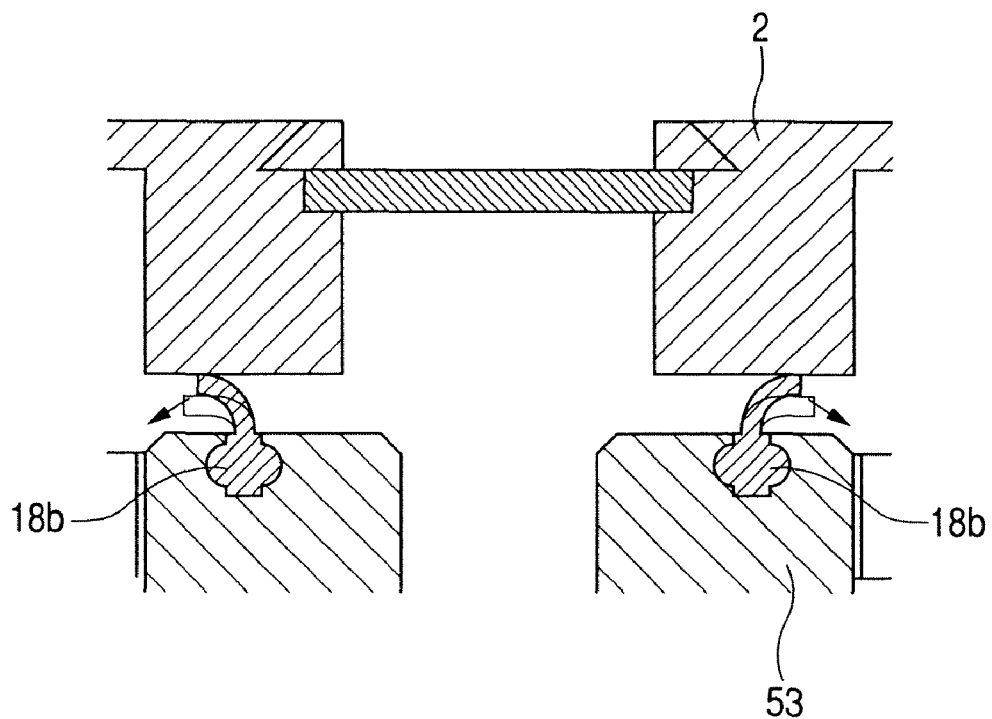
FIG. 8B is a view illustrating a schematic section of the conventional seal member, the intake/exhaust port edge portions in the plate using this seal member and the opposite intake/exhaust port edge portions in the pod.

FIG. 5 illustrates a schematic perspective view of the plate 53. A positioning pin 12, an intake port 14 and an exhaust port 16 are provided on the surface of the plate 53. The seal members 20 according to the present invention are disposed along the opening portions of these intake and exhaust ports 14, 16. FIGS. 6 and 7 illustrate outlines of sectional configurations of the plate 53 and the pod 2 placed on the plate 53. FIG. 6 illustrates a state just before the pod 2 is to be placed. FIG. 7 illustrates a state where the pod 2 has been placed. Note that a suction line 19 for depressurizing the space formed between the seal members 20 and edge portions of the intake/exhaust ports of the pod 2, extends inwardly of the plate 53 in the present applied example. The suction line 19 communicates with the space via the suction hole 20d. The suction line 19 is connected to an unillustrated vacuum exhaust system serving as an external apparatus.

A purge operation in the FOUP system, to which the present invention is applied, will hereinafter be described with reference to the drawings. To start with, the semiconductor wafers 1 are accommodated in the interior of the pod 2, and the interior of the pod 2 is set into an airtightly closed space by the cover 4. Then, the pod 2 is carried to above the plate 53. The pod 2 is placed on the plate 53 in a state where the positioning pin 12 protruding above the plate 53 is substantially fitted in a recessed portion 5 formed in the lower portion of the pod 2. In this state, an intake port 7 and an exhaust port 9 on the pod side are abutted via the seal members 20 on the intake port 14 and the exhaust port 16 on the side of the plate 53.

Herein, an operation of exhausting an interior of a space 20e formed between the seal members 20 and the intake/exhaust port edges on the side of the pod 2, is conducted by use of the suction line 19. The space 20e is depressurized by this exhausting operation. The seal members 20 are firmly airtightly fitted to the abutting-target intake/exhaust port edges on the side of the pod 2 by dint of an effect of the depressurized space 20e. After finishing or while continuing this operation, the purge operation of the interior of the pod 2 is performed. The purge operation involves replacing an internal atmosphere of the pod 2 by circulating a replacement gas in the sequence such as the intake port 14 on the side of the plate 53, the seal member 20, the suction port 7 on the side of the pod 2, a filter 11, the interior of the pod 2, the filter 11, the exhaust port 9 on the side of the pod 2, the seal member 20 and the exhaust port 16 on the side of the plate 53.

The seal members 20 according to the present invention are, as described above, employed at the Loadport, whereby the intake line and the exhaust line can maintain, irrespective of which pressure, a positive pressure or a negative pressure, these intake/exhaust lines are kept in, this state while keeping the sufficient sealing characteristic with respect to the external environment. Accordingly, the atmosphere can be replaced under such a condition as not to cause a disturbance of the air flow in the interior of the pod 2 such as enabling the replacement gas to be sent into the interior of the pod 2 at a much lower flow speed than by the prior art. The internal pressure of the depressurized space 20e is monitored via the suction line 19, thereby enabling also the sealing state of the seal member 20 to be monitored.

Note that the present embodiment has exemplified the plate 53 in which the intake port and the exhaust port are formed respectively as the single systems, and the pod 2 corresponding thereto. The construction to which the present invention can be applied is not, however, limited to this construction, wherein it is preferable to increase or decrease the number of components properly in a way that takes account of a gas replacing speed required, a quantity of content of the pod 2, etc. A construction having only the intake port may also be available. In this case, the replacement gas is supplied to the interior of the pod via the port, and the internal pressure of the pod is made larger by the replacement gas etc than the atmospheric pressure of the outside, thereby decreasing the sealing strength between the cover 4 and a pod main body 2a. Thus, the internal atmosphere of the pod 2 is flowed from between the cover 4 and the pod main body 2a due to the decreased sealing strength, whereby the interior of the pod may be exhausted.

In the present applied example, the seal members according to the present invention are disposed on the side of the plate. The seal members may also, however, be disposed on the side of the pod without being limited to the plate side. In this case, the suction hole is not provided, and an exhaust system for exhausting the interior of the space may be connected to a contact portion, of the sealing surface on the plate side, with the space formed between the inner peripheral lip and the outer peripheral lip. The discussion on the present applied example is targeted at the FOUP, however, the applied example of the present invention is not limited to this system. The seal members according to the present invention can be applied to the system, which needs purging the atmosphere of the interior of the container, having the container inwardly accommodating the plurality of retained objects and the carrier chamber in which to carry the retained object from the container to the apparatus that processes the retained object.

This application claims priority from Japanese Patent Application No. 2006-042324 filed Feb. 20, 2006 which is hereby incorporated by reference herein.

What is claimed is:

1. A gas replacement system comprising:
a storage container for storing an object therewithin and including a container opening;
a mount unit on which the storage container is mounted and that includes a mount unit opening; and
a seal member disposed between the storage container and the mount unit so as to connect an inner space of the storage container with a gas supply or discharge system provided on the mount unit through the container opening and the mount unit opening,
wherein the seal member comprises:
a main body portion taking a ring shape and fixed along an outer periphery of one of the container opening and the mount unit opening;
a first lip portion extending from an inner periphery of the ring shape of the main body portion to the storage container or the mount unit on which the main body portion is not fixed, and having a cylindrical shape of which an upper portion when cutting the cylindrical shape in a lengthwise direction is semi-circular so as to suppress flexural deformation thereof;
a second lip portion extending from an outer periphery of the ring shape of the main body portion to the storage container or the mount unit on which the main body portion is not fixed, and having a funnel-like shape of which an inside diameter increases as it extends farther away from said main body portion so as to enhance flexural deformation thereof; and
a hole penetrating to a sealed space formed by the first lip portion, the second lip portion, the main body portion, and a surface of the storage container or the mount unit on which the main body portion is not fixed, so as to generate a suction force by discharging the sealed space so that the first lip portion and the second lip portion closely contact with the surface of the storage container or the mount unit on which the main body portion is not fixed, and
wherein the gas is supplied to or discharged from the storage container through a sealed path formed by closely contacting the first lip portion with the surface of the storage container or the mount unit on which the main body portion is not fixed,
the second lip portion separates the sealed path and the sealed space from an ambiance by closely contacting with the storage container or the mount unit on which the main body portion is not fixed, and the gas supply operation to the inner space of the storage container or the gas discharge operation from the inner space of the storage container is conducted while closely contacting the first lip portion and the second lip portion with the surface of the storage container or the mount unit on which the main body portion is not fixed.

* * * * *